United States Patent
Walters

[15] 3,672,485
[45] June 27, 1972

[54] EGG COLLECTING APPARATUS

[72] Inventor: Anthony George Walters, Ford, near Shrewsbury, England

[73] Assignee: Salopian Industries (Metals) Limited, Shrewsbury, Shropshire, England

[22] Filed: July 2, 1970

[21] Appl. No.: 52,053

[52] U.S. Cl. ..................................198/26, 119/48, 198/79
[51] Int. Cl. ................A01k 31/14, B65g 47/08, B65g 47/12
[58] Field of Search ..........................209/90, 100; 119/48; 198/25–26, 30, 168, 156, 79

[56] References Cited

UNITED STATES PATENTS

| | | | |
|---|---|---|---|
| 2,264,156 | 11/1941 | Apple | 119/48 |
| 1,892,670 | 1/1933 | Jaeger | 198/26 X |
| 663,142 | 12/1900 | Warning | 198/26 X |
| 448,394 | 3/1891 | Wheelan | 209/90 X |
| 1,885,946 | 11/1932 | Redler | 198/168 |

FOREIGN PATENTS OR APPLICATIONS

| | | | |
|---|---|---|---|
| 1,295,475 | 2/1965 | Germany | 198/156 |

*Primary Examiner*—Edward A. Sroka
*Attorney*—Kemon, Palmer & Estabrook

[57] ABSTRACT

Egg collecting apparatus for collecting eggs delivered to one end of a row of tiered battery cages by delivery conveyors serving each tier, which apparatus includes an elevator which collects eggs from at least some of the delivery conveyors and discharges them all at one level.

19 Claims, 5 Drawing Figures

EGG COLLECTING APPARATUS

This invention relates to egg collecting apparatus for use in battery cage systems in which the cages are arranged in tiered rows.

It is known to use conveyors extending below the tiers of battery cages in a tiered row to deliver the eggs laid by the hens in the cages to one end of the row for collection. Hitherto the eggs delivered by the conveyors have usually been collected in trays, pallets, boxes or other receptacles at the row, there being a separate receptacle for each tier of the row. The receptacles have either been fixed at the end of the row, or they have been incorporated in a mobile unit which can be moved from one row of cages to another to collect the eggs and then transport them away for grading, cleaning and so on. In both cases the eggs have had to be removed from the trays at several different levels, normally there are at least three, and often four, tiers of cages in a tiered row so that the trays are at at least three levels, which means that a person when removing the eggs from the receptacles has to bend and stretch to get at all the receptacles. In fact in a three tiered row, as the receptacle which collects from the topmost tier will usually be 6 feet or so from ground level, it is generally necessary for a step ladder or other means to be used to climb on to get at the top receptacle more easily. This is not entirely satisfactory, and the main object of the present invention is to avoid this.

An object of the present invention is to provide egg collecting apparatus for use in a tiered battery cage system for hens in which eggs are delivered to one end of a row of tiered cages by delivery conveyors serving each tier, which apparatus comprises an elevator adapted to be positioned at the discharge ends of the delivery conveyors, the elevator extending to all the delivery conveyors of the row and being arranged to collect eggs from at least some of the delivery conveyors and discharge them all at one level.

The elevator may discharge the eggs onto or into a tray, pallet, box or other suitable receptacle at a convenient level for a person readily to remove the eggs without his having to bend or stretch, or the elevator may discharge the eggs onto a further conveyor which takes, or forms part of a system of conveyors which take, the eggs away to an area where they are graded, cleaned or otherwise handled. The elevator may lift all the eggs collected from the delivery conveyors serving the various tiers of the row to the discharge level, or it may lower all the eggs collected to the discharge level, or it may lift the eggs collected from one or more delivery conveyors to the discharge level and lower the eggs collected from the other conveyor or conveyors to the discharge level. Where the elevator discharges the eggs onto or into a receptacle serving say a three tier row of cages, the receptacle is conveniently positioned at about the level of the middle tier, in which case the elevator lifts the eggs from the lower tier to the receptacle and lowers the eggs from the upper tier to the receptacle. If the receptacle, or the further conveyor, is positioned at the level of a delivery conveyor serving one of the tiers, the eggs delivered by that delivery conveyor may be discharged directly onto the receptacle, or the further conveyor.

The use of the elevator in combination with a further conveyor or system of conveyors as mentioned above to take the eggs away to the area where they are graded, cleaned or otherwise handled is particularly advantageous, as will be appreciated, because of the resultant elimination of manual handling of the eggs between the battery and that area, and hence the saving of labor in collecting and transporting the eggs and speeding-up of egg collection. The further conveyor or system of conveyors may serve several rows of tiered cages. chain, or The elevator may be formed by baskets, pockets or other receptacles carried by an endless chain,or chains. It may be of any other suitable form, if preferred.

A further object of the present invention is to provide carefully controlled passage of the eggs from the delivery conveyors to the elevator.

With this further object in view the egg collecting apparatus now provided includes a plurality of transfer mechanisms, one for each of the delivery conveyors past which the elevator travels, each transfer mechanism comprising a perforate platform constructed and arranged to be located at the discharge end of one of the delivery conveyors as a continuation thereof in the direction of the delivery conveyor and at least one rotor at the platform of substantially planar form rotatable about an horizontal axis below the surface of the delivery conveyor and transverse to the direction of travel of the conveyor, and having a plurality of angularly spaced, outwardly extending arms which, as the rotor turns, project in turn through the platform for propelling eggs along said platform at a controlled rate from the delivery conveyor to the elevator. Preferably each transfer mechanism has several similar rotors spaced co-axially apart and connected for simultaneous rotation. The several rotors may be mounted on, for rotation with, a common drive shaft. The drive for the rotor or rotors is taken from the drive of the elevator so that the rotor or rotors are directly controlled by operation of the elevator.

Where the elevator collects eggs from say two delivery conveyors at different levels and takes them to a further level at which they are discharged, the rotors at the two delivery conveyors are co-ordinated with respect to one another and the elevator such that they feed eggs from their associated delivery conveyors into alternate receptacles of the elevator. If the elevator collects from three delivery conveyors then the rotors at the conveyors are arranged to feed eggs from their respective associated conveyors into every third receptacle of the elevator. If the elevator collects from four delivery conveyors the rotors feed eggs from their respective associated conveyors into every fourth receptacle of the elevator, and so on. Thus the eggs collected from the delivery conveyors at the different levels are received into different receptacles of the elevator and are therefore kept separate from one another on the elevator.

The platforms of the transfer mechanisms may be of wire grid form each comprising parallel wires extending i the direction of travel of the delivery conveyors, with the rotor or rotors disposed between the wires and arranged so that its, or their, arms feed the eggs from the delivery conveyor to the elevator by causing the eggs to roll along the wires of the platform at a controlled rate and onto the elevator. A platform of other suitable construction may be provided instead, if desired.

An embodiment of the present invention will now be described by way of example with reference to the accompanying drawings in which.

Figure 1:
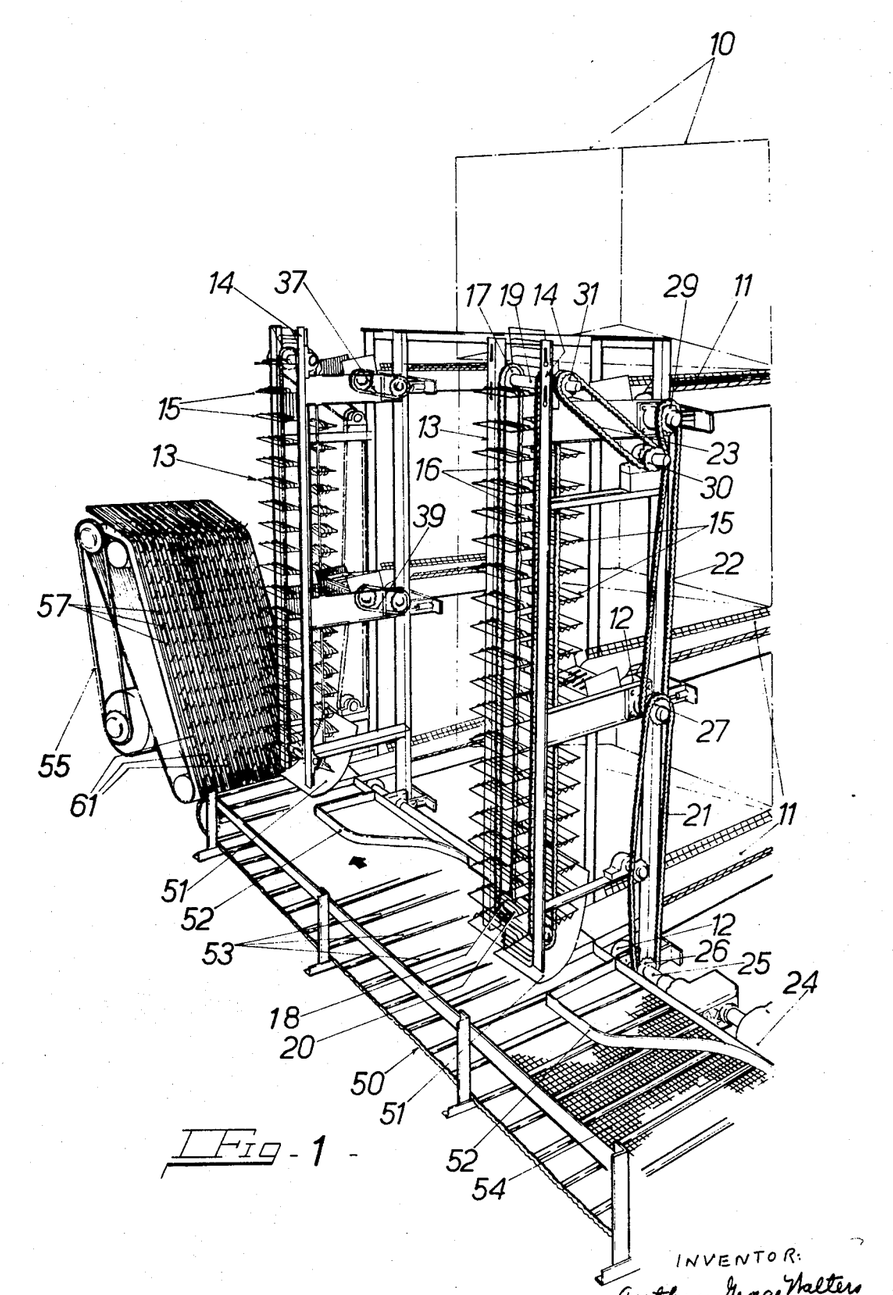
FIG. 1 is a perspective view of a battery system in which there are two tiered rows of cages to which egg collecting apparatus in accordance with the invention is applied.

In this embodiment egg collecting apparatus in accordance with the present invention is provided for collecting eggs from each of two, back-to-back, three tiered rows of cages, as shown in FIG. 1. Extending horizontally along the length of and underneath the cages 10 in the tiers of each row are delivery conveyor belts 11. The delivery conveyor belts 11 pass around rollers 12 at the ends of the tiers.

At one end of each row there is a vertically extending elevator 13 which is supported by a framework 14 of metal angle-iron members opposite the discharge ends of the delivery conveyors 11. Each elevator extends from opposite the discharge end of the delivery conveyor belt 11 serving the bottom tier of cages of the row with which the elevator is associated, to just above the discharge end of the delivery conveyor belt serving the top tier of cages of the row. Each elevator 13 is formed by a plurality of shallow, open wire-work baskets 15 carried at equally spaced intervals by a pair of spaced endless chains 16 which pass around sprockets 17 and 18 on spindles 19 and 20 supported by the framework 14 at the top and bottom respectively of the runs of the elevator 13. The upper spindle 19 is driven, to drive the elevator 13, through chains 21, 22 and 23 by an electric motor 24. An output shaft 25 connected to the motor 24 drives the roller 12 at the discharge end of the delivery conveyor belt 11 serving the bottom tier of cages 10, which roller drives that belt. A first one 21 of the chains is driven by a sprocket 26 on the output shaft 25 and takes the drive to one wheel of a two wheel sprocket 27 mounted on the axle of the roller 12 at the discharge end of the delivery conveyor belt 11 serving the middle tier of cages. The other wheel of the sprocket 27 drives a second one 22 of the chains. This chain 22 in turn drives a sprocket 29 mounted on the axle of the roller 12 at the discharge end of the delivery conveyor belt 11 serving the top tier of cages 10. Like the roller 12 at the discharge end of the bottom delivery conveyor belt 11, the roller 12 at the discharge ends of the middle and top delivery conveyor belts also drive these belts. Just below the top sprocket 29, one wheel of a two-wheel sprocket 30 is in mesh with the second chain 22, the other wheel of which sprocket 30 drives the third chain 23, which engages a sprocket 31 on one end of the upper spindle 19. The rollers 12 and the two-wheel sprocket 30 are all supported by the framework 14. The chain drives of both elevators 13 are driven by just the one electric motor 24.

Figure 2:
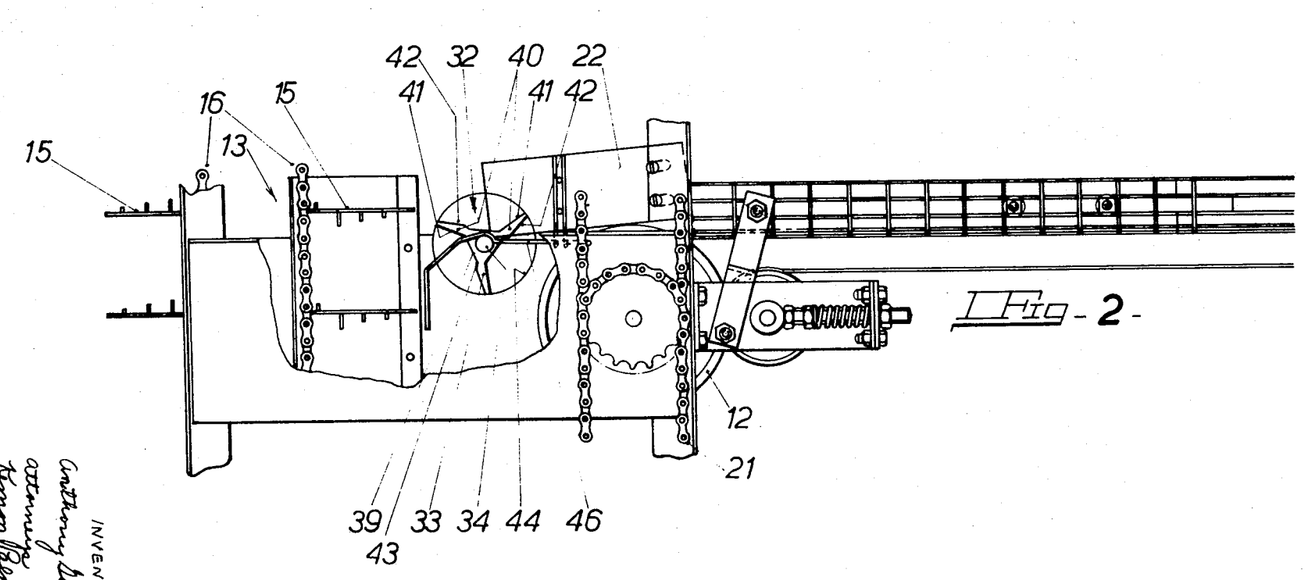
FIG. 2 is an enlarged detail plan view of egg transfer means provided at the discharge end of each delivery conveyor from which an elevator of the apparatus collects eggs.
Figure 3:
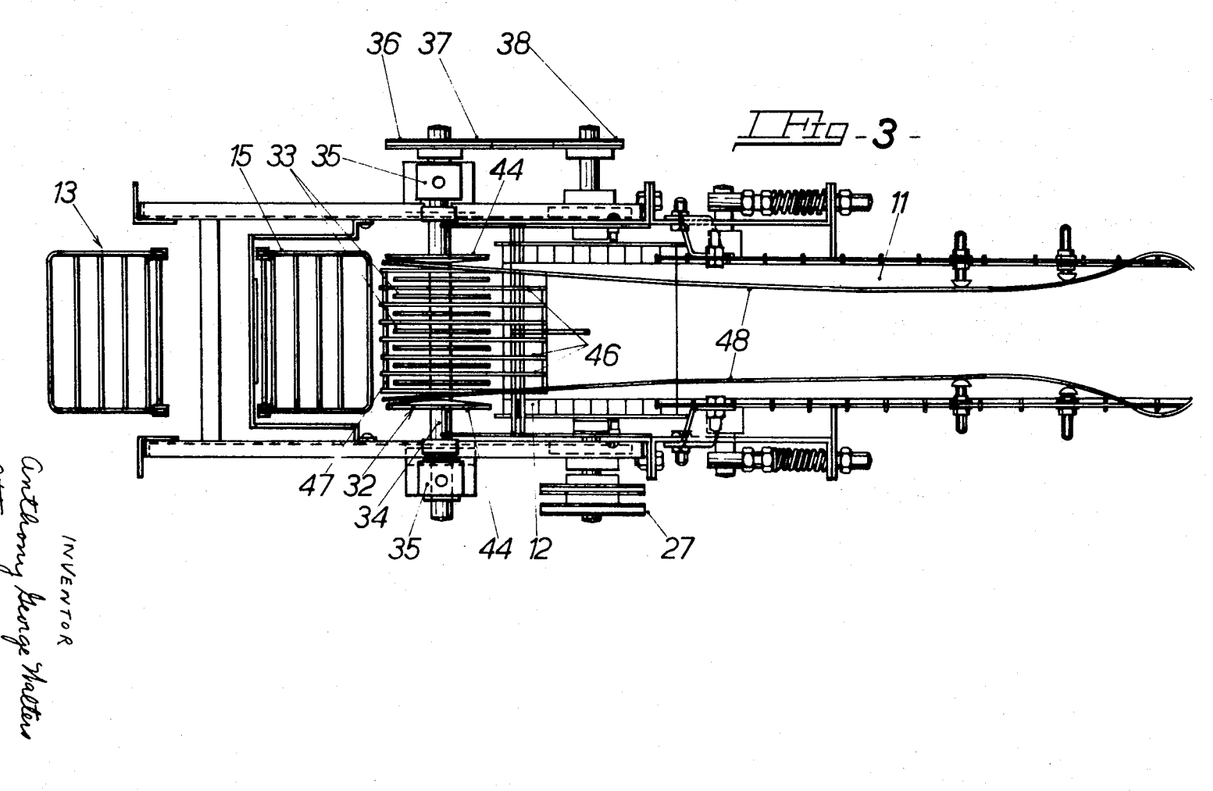
FIG. 3 is a side view of the egg transfer means.

At the discharge end of each of the delivery conveyor belts 11 serving the middle and top tiers of cages 10 of each row, egg transfer mechanisms 32 are provided, as shown in FIGS. 2 and 3. Each egg transfer mechanism 32 comprises multiple similar rotors 33 equally spaced apart on and keyed to, and also similarly disposed on, a common drive shaft 34. The drive shaft 34 is journalled in brackets 35 at opposite sides of the discharge end of the delivery conveyor belt 11, and is supported so that it is spaced just beyond the discharge end of the delivery conveyor belt and just below the level of the top run of the belt, with its rotational axis extending horizontally and transversely of the direction of travel of the delivery conveyor belt. The drive shaft 34 is fitted with a chain sprocket 36 through which drive is transmitted to the shaft by way of chain 37 driven by a sprocket 38 on the axle of the roller 12 which drives the delivery conveyor belt adjacent which the egg transfer means 32 is provided. Thus the rotational speed of the drive shaft 34 is directly related to the speed of travel of the delivery conveyor belt and of the elevator 13. Since the delivery conveyor belts 11, the elevators 13 and the drive shafts 34 are all driven by just the one motor 24, if one stops they all stop.

Each rotor 33 is planar with a hub 39, FIG. 3, of substantially equi-lateral triangular shape and three integral equi-angularly spaced arms 40 which extend from the three corners of the hub 39 with the main axis of each arm 40 extending tangentially to the surface of the drive shaft 34 carrying the rotor 33. The arms 40 taper slightly away from the hub 39. The leading edge 41 of each arm 40 is straight and meets the adjacent side edge of the hub at an obtuse angle such that the leading edge 41 is substantially radial to the axis of the drive shaft 34. The trailing edge 42 of each arm is also straight but it extends substantially parallel to the adjacent side edge of the hub 39 and there is an inclined step 43 down from the trailing edge 42 to the adjacent side edge of the hub.

Also on the drive shaft 34 and spaced outwardly from the end rotors 33 on the shaft are two discs 44.

Mounted adjacent the discharge end of the middle and of the top delivery conveyor belt 11 is a wire grid platform comprising several spaced, parallel stiff wires 46 which extend in the direction of travel of the delivery conveyor belt 11 and slightly downwards away from the belt, and over the drive shaft 34 between the rotors 33 and also between the end rotors and the discs 44. Beyond the drive shaft 34 the end portions of the wires 46 are inclined more sharply downwards, and they are interconnected at their ends by a cross wire 47.

In operation, eggs that are brought by each of the middle and top delivery conveyor belts 11 to the discharge end of the belt roll onto the platform and along the wires 46 of the platform to the rotors 33. Adjustable strips 48 along opposite sides of these two delivery conveyor belts funnel the eggs in not more than double file to the discharge end of the belt. As the rotors 33 turn, anti-clockwise as viewed in FIG. 3, their arms 40, as they pass upwards between the wires 46, ease their way in between the leading eggs and those immediately behind accumulated on the platform, in whatever manner the eggs may be disposed, and as they move upwards behind the leading eggs they encourage those eggs to roll in front of them along the wires and over the drive shaft 34. The end discs 44 on the drive shaft 34 and the strips 48, prevent the eggs from rolling sideways out of engagement with the rotors 33 and falling off the wires 46. Once they are over the drive shaft 34 the eggs roll down the slope of the more sharply inclined end portions of the wires 46, but the fall of the eggs down the slope is controlled by those arms 40 of the rotors 33 immediately in front of the eggs. The steps 43 between the trailing edges 42 of these arms 40 and the hubs 39 of the rotors 33 act as stops to restrain the eggs from falling freely down the slopes of the wires almost right up until the moment when the arms pass down between the wires 46 in front of the drive shaft 34. At that stage the eggs are in a position from which they only have a short distance to fall freely and gently into a passing basket 15 of the elevator 13. The wires 45 end just short of the basket 15 so that they will not foul the baskets but extend close enough to the baskets to ensure that eggs cannot fall anywhere else but into the basket 15.

The rotational speed of the rotors 33 is coordinated with the speed of travel of the elevator 13 so that as the eggs roll down the slope of the wires 46 beyond the drive shaft 34 a basket 15 is always moving into position to collect the eggs as they fall from the wires. The eggs from the top and middle tier delivery conveyor belts 11 are collected by alternate baskets 15 of the elevator 13.

The baskets 15 yield resiliently slightly on their supporting chains 16 as eggs fall into them, and so break the fall of the eggs.

The number of eggs transferred at any one time by either one of delivery conveyor belts to the elevator 13 by the rotors 33 is limited to the number of eggs which can be accommodated in a basket 15 of the elevator at one time.

The egg transfer means described feeds the eggs very gently from the delivery conveyor belts 11 to the elevator 13 so that there is no risk of damage to the eggs. Even soft-shelled or mal-formed, or cracked, eggs can be transferred to the elevator without risk of further damage.

Eggs collected by each elevator 13 are retained in the baskets 15 until they reach the discharge level, which, as shown in FIG. 1, is at the height of the delivery conveyor belt 11 serving the bottom tier of cages 10. Running horizontally past the discharge ends of the delivery conveyor belts serving the bottom tiers of the two rows of cages 10 is a receiving conveyor 50 and it is onto this conveyor that the eggs collected from both rows of cages are discharged. The receiving conveyor 50 forms part of a system of conveyors which take the eggs away to an area where they are graded, cleaned or otherwise handled. It is driven by the electric motor 24. It could alternatively be driven by its own independent motor and this may be desirable where the receiving conveyor 50 receives eggs from a large number of rows. When the baskets 15 of each elevator 13 reach the bottom of the elevator and they pass under the bottom spindle 20, they tip the eggs they have collected onto a downwardly curved chute 51 which guides the eggs onto the receiving conveyor 50. The eggs on the delivery conveyor belts 11 serving the bottom tiers of the two rows of cages 10 are discharged directly onto the receiving conveyor 50. The chute 51 at the bottom of each elevator 13 serves to keep the eggs which are discharged directly onto the receiving conveyor 50 by the bottom tier delivery conveyor belt 11 separate from the eggs discharged onto the receiving conveyor by the elevator, so as to avoid any possibility of the two lots of eggs running into one another and perhaps causing breakages. Barriers 52 are provided which extend part of the way across the receiving conveyor 50 in advance of each elevator and serve to deflect eggs already in the conveyor out of the path of eggs being discharged onto the conveyor.

The receiving conveyor 50 is constructed from spaced flat slats 53 of thin section, for example of the order of one-sixteenth inch thick, which travel along a perforate bed 54. The slats 53 normally push the eggs along the conveyor bed 54 but if an obstruction should occur on the conveyor, or too many eggs are received onto the conveyor, the slats, being thin, pass underneath the eggs so that undue loading on the drive of the conveyor is avoided.

The receiving conveyor 50 takes the eggs to an inclined conveyor 55 which takes the eggs to a higher level. At the higher level the eggs pass onto a further horizontal conveyor, not shown, which may take the eggs directly to the handling area previously mentioned or connect with other substantially horizontal conveyors which take the eggs to the handling area. The inclined conveyor 55 is driven by its own independent electric motor 71.

Figure 4:
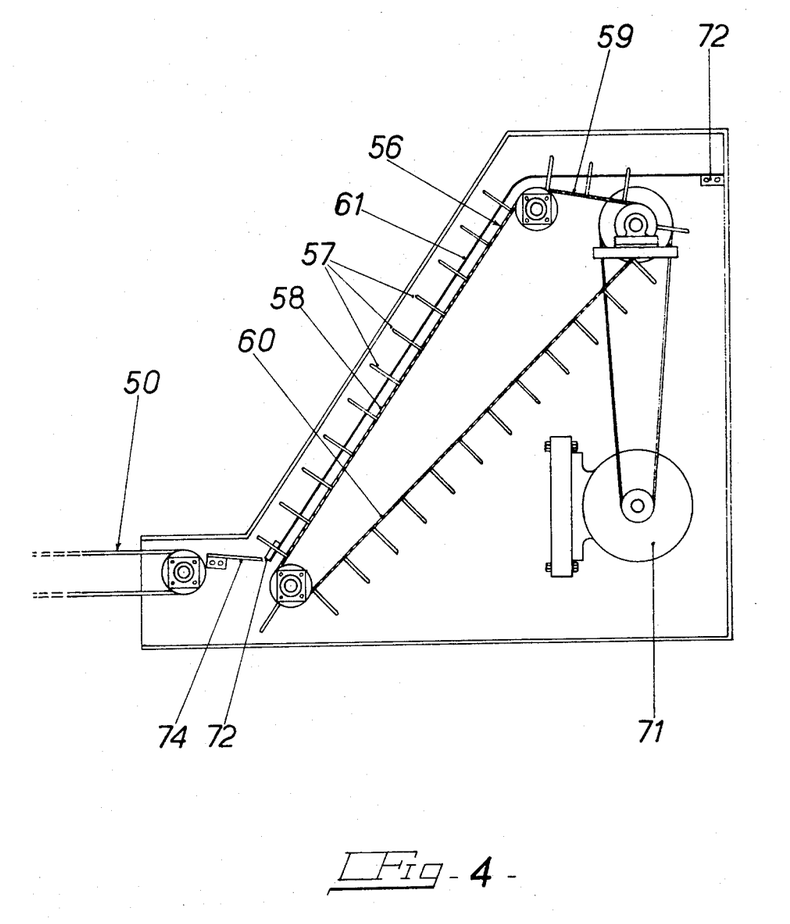
FIG. 4 is a simplified side view of an inclined conveyor forming part of a receiving conveyor system of the apparatus.

The inclined conveyor 55, as best seen in FIG. 4, comprises a band 56, preferably of openwork structure, having equally spaced transverse rows of spaced wire carrier fingers 57 projecting perpendicularly from it. The band 56 runs a substantially triangular course comprising a main, upwardly-inclined, stretch 58; a slightly downwardly-inclined top stretch 59 running on from the top of the main stretch 58, and a sharply downwardly-inclined return stretch 60 leading back down to the bottom of the main stretch 58. Extending lengthwise of the main stretch 58 from bottom to top and over the top stretch 59 are spaced slats 61 arranged so that the carrier fingers 57 of the band 56 travel along the spaces between the slats 61. The ends of the slats 61 are anchored to cross-members 72 of a supporting structure 73 of the inclined conveyor 55 at the bottom of the main stretch 58 and above the end of the top stretch 59 where it runs into the return stretch 60. The slats 61 lie close to the surface of the band 56 at the main stretch 58, but above the top stretch 59 the slats 61 extend substantially horizontally so that the top stretch inclines gradually downwardly away from the slats towards the end of the top stretch which runs into the return stretch 60. At the bottom of the main stretch 58 of the band 56, adjacent the discharge end of the receiving conveyor 50, there is a rack 74 which slopes downwardly away from the receiving conveyor and receives eggs delivered to the inclined conveyor 55. It is formed by spaced wire rods between which the spaced carrier fingers 57 of the band 56 pass upwardly to pick up the eggs from the rack 74 to take them to the higher level.

Eggs picked up by the carrier fingers 57 from the rack 74 are carried by the fingers up the main stretch 58 of the inclined conveyor 55, the eggs lying against the slats 61 as they are carried upwards. When the eggs reach the top of the main stretch 59 they cease to be supported by the carrier fingers 57 and are instead supported entirely by the slats 61 above the top stretch 59 of the conveyor. The angle of inclination of the top stretch 59 with respect to the horizontally extending portions of the slats 61 above that stretch is quite shallow and therefore the carrier fingers 57 pass gradually down between the slats 61 and out of contact with the eggs. Because of this there is no risk of the eggs being trapped and crushed by the carrier fingers 57 as the fingers pass down between the slats 61 at the top stretch 59, and neither is there risk of the eggs being crushed by the rows of carrier fingers 57 following after those from which eggs have just been released. The momentum imparted to the eggs by the carrier fingers when they reach the top stretch 59 of the inclined conveyor 55 is sufficient to cause the eggs to roll along the slats 61 and onto the horizontally extending conveyor, not shown, with which the inclined conveyor connects.

With an appropriately modified elevator it would be possible for the receiving conveyor 50 to be at the level of the delivery conveyors 11 serving the middle or top tiers of the rows of cages. For example, if the receiving conveyor was at the level of the top tier delivery conveyor the elevators may each be of generally similar construction to the elevators 13 described above except that the upward run of the elevator, which would then collect the eggs from the delivery conveyors, instead of travelling vertically upwards, travels upwards in a concave curve. The curvature would be such that in the lower stages of their upward travel the baskets tilt upwards slightly away from their supporting encless chains; in the intermediate stages the baskets are substantially horizontal, and in the upper stages of their upward travel the baskets gradually tilt downwardly until at the top of the upward run the tilt is sufficient for the eggs to roll out of the baskets onto the receiving conveyor. A further possibility would be to have the baskets of the elevator pivoted to the endless chains and normally urged by spring loading to a condition in which they project perpendicularly from the runs of the chains, and to arrange for each basket to be tilted downwards against the spring loading as it approaches the top of the upward run, to allow the eggs to roll out of the basket onto the receiving conveyor. Other ways may be employed of arranging for the eggs to be discharged onto the receiving conveyor when the baskets near the top of their upward travel. The eggs from the top tier of each row of cages may be discharged by the delivery conveyor serving that tier directly onto the receiving conveyor.

If desired, the elevator 13 could discharge the eggs into a tray or basket instead of into the receiving conveyor 50. In such an arrangement the delivery conveyor 11 from which the elevator 13 does not collect eggs would discharge its eggs directly into the tray or basket.

Figure 5:
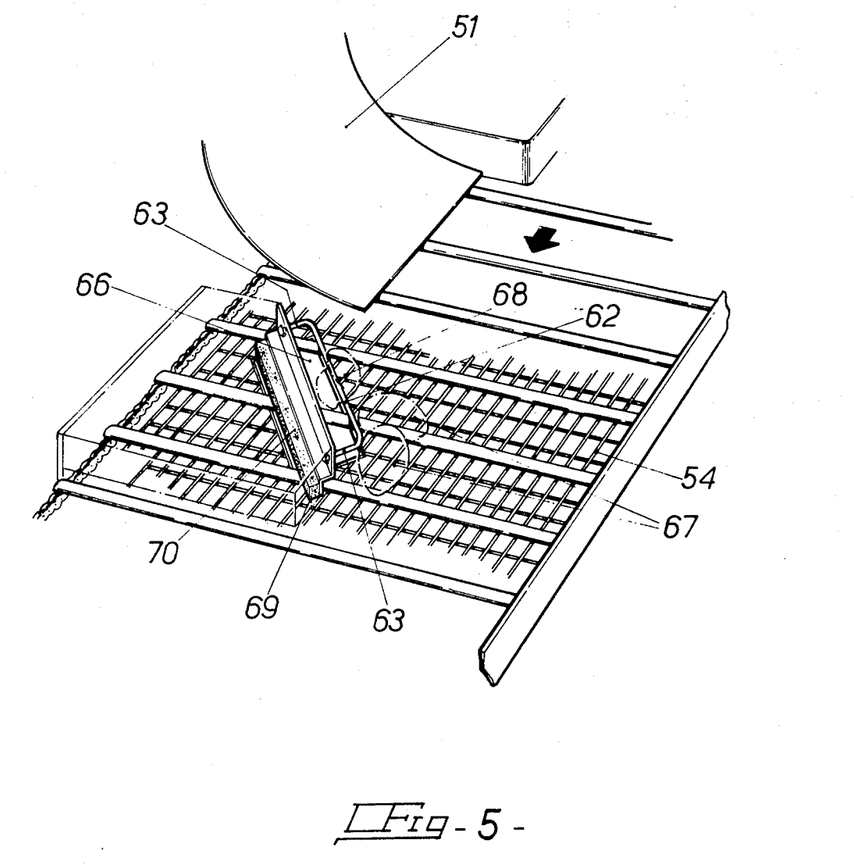
FIG. 5 is a fragmentary perspective view of a modification which may be applied to a conveyor of the receiving conveyor system of the apparatus to separate broken and soft-shelled eggs from sound eggs.

Soft-shelled, otherwise mal-formed, and cracked eggs have a use. If desired, in the embodiment described and illustrated, an arrangement may be provided at the receiving conveyor 50 to segregate at least some of these imperfect eggs from the sound eggs. Such an arrangement is shown in FIG. 5. This comprises a straight, horizontal barrier 62 which extends across part of the receiving conveyor 50 so that it lies in the path of eggs travelling along the conveyor. The barrier 62 is formed by the intermediate part of a length of stiff wire bent to a wide U-shape. The parallel arms 63 of the wire are secured at their ends rigidly to a carrier 64 which is mounted on one side wall of the receiving conveyor and extends approximately half-way across the width of the conveyor. The barrier 62 is supported so that it inclines rearwardly in the direction of travel of the conveyor from near the side wall supporting the carrier 64 towards the center of the conveyor, and it is supported at a hight above the bed 54 of the receiving conveyor corresponding to approximately half the height of a normal, properly formed, egg lying on its side on the bed. A hole 66 is formed in the bed 54 just behind the barrier 62. A tray not shown, or other suitable receptacle is positioned below the hole 66.

When properly formed eggs, such as are indicated at 67 in FIG. 5, on the receiving conveyor 50 come into contact with the barrier 62 they are deflected by the inclination of the barrier and roll across the conveyor in front of the barrier until they reach the free end of the barrier. Once past the end of the barrier 62 these eggs continue their travel along the conveyor. Soft-shelled eggs, however, and other eggs without shells of with non-rigid shells, such as the eggs indicated at 68 in FIG. 5, when they come into contact with the barrier 62, because of their non-rigid shells and their consequent resistance to rolling, are not deflected across the conveyor like the others, but instead they continue to travel forward with the conveyor in substantially the same straight line. As they are pressed up against the barrier 62 by the motion of the slats 53 of the receiving conveyor 50, since they are unable to offer resistance to the pressure imposed upon them by the barrier, they are deformed and compressed downwardly to some extent by the barrier sufficiently for them to pass underneath the barrier. Having passed under the barrier 62 they fall through the hole 66 in the conveyor bed 54 and into the receptacle below the hole.

The bottom of the part of the carrier 64 which supports the barrier 62, and which is to the rear of the hole 66, is shaped to form a scraper 69. Hence if an imperfect egg should be resting on one of the slats 53 of the receiving conveyor when it meets the barrier 62 and is not knocked off the slat 53 by the barrier but passes underneath the barrier still on the slat, it will be dislodged from the slat by the scraper 69 and fall through the hole 66. A sponge rubber squeegee 70 is provided at the scraper 69 to clean off any remains of broken eggs which there may be on the slats 53 of the conveyor.

Preferably there are two of the barriers 62 spaced apart along the receiving conveyor 50 and disposed at opposite sides of the conveyor. Thus if imperfect eggs on the conveyor miss one barrier 62 they will run into the other.

The segregation of imperfect eggs from the good ones at the receiving conveyor 50 serves two purposes. It saves the eggs from being damaged, or further damaged, on the receiving conveyor, or any other conveyor in the conveyor system of which the receiving conveyor forms a part, and secondly in consequence of this saving of damage, or further damage, it helps to keep the receiving conveyor, and the others leading from it, clean.

If desired there may also be provided at the receiving conveyor 50 control means which is automatically operated to stop the delivery conveyors 11 serving the rows of cages 10 in the battery system, so that the supply of eggs to the elevators 13, and hence to the receiving conveyor, is stopped if the eggs should become jammed on the receiving conveyor, or if there is an excessive accumulation of eggs on the receiving conveyor such that the number of eggs on the conveyor cannot be coped with satisfactorily. It will be understood that the inclined conveyor 55 in the embodiment described and illustrated is limited in the number of eggs which its rows of carrier fingers 57 can support at any one time, so that if the receiving conveyor 50 delivered more eggs to the inclined conveyor 55 than the inclined conveyor could carry away there would be a consequent undesirable build-up of eggs on the receiving conveyor 50 at the foot of the inclined conveyor 55. This is an example of an instance when it would be desirable to stop the supply of eggs to the receiving conveyor 50, or at least reduce the supply of eggs, until the inclined conveyor 55 had been able to clear away the undesirable build-up of eggs on the receiving conveyor. The control means may operate automatically to put the stopped delivery conveyors 11 back into operation as soon as the obstruction on the receiving conveyor 50 clears itself, or is cleared, or the number of eggs on the conveyor is reduced to a quantity satisfactory for handling.

The control means may simply comprise one of more electrical pressure-operated, switches connected to the electric motor 24 and provided at the side of the receiving conveyor 50 at selected positions. When eggs become jammed and obstruct the direct forward travel of eggs following behind and along the receiving conveyor, or there is an excessive accumulation of eggs on the conveyor, the tendency usually is for the eggs to spread out across the conveyor so that the eggs then build-up at the side of the conveyor. The switch, or switches, positioned at the side of the receiving conveyor will therefore be sensitive to the pressure of any build-up of eggs at the side of the conveyor and will be operated if the pressure acting on it, or them, exceeds a predetermined level.

If in a battery system with several tiered rows of cages there is a separate motor for each row, or for individual groups of rows of cages in the system, to drive the delivery conveyors and elevator or elevators of the row or group of rows, the switch or switches of the control means may be arranged so that they do not stop the motors serving all of the rows of cages each time there is an obstruction or excessive accumulation of eggs on the receiving conveyor, and hence stop delivery of eggs to the receiving conveyor altogether from the rows, but instead stop the motors of the different rows or groups in turn. Thus during an egg collecting operation, at the first obstruction or excessive accumulation of eggs on the receiving conveyor 50, the switch, or that one of the switches operated by the resultant build-up of eggs, may cause the motor serving just one tiered row of cages, or groups, to be stopped until the obstruction is cleared, or the excess of eggs on the receiving conveyor is removed, while the motors of the other rows or groups of rows continue to operate, so that eggs continue to be discharged onto the receiving conveyor 50 from those rows. When the second obstruction or excessive accumulation occurs the motor of another row or group of rows is the only one which is stopped until the obstruction is cleared or the excess of eggs removed, and so on, each row or group of rows of cages in turn having its motor stopped as successive obstructions or excessive accumulations occur. In this way there is not an undue build-up of eggs on the delivery conveyors 11 of any one row or group of rows of cages; there is always a continuous supply of eggs to the receiving conveyor during a collecting operation in spite of obstructions or excessive accumulations; and there is a continuous delivery of eggs from the receiving conveyor which does not vary unduly.

I claim:

1. Egg collecting apparatus for use in a tiered battery cage system for hens in which eggs are delivered to one end of a row of tiered cages by delivery conveyors serving the tiers, which apparatus comprises:

an elevator adapted to be positioned adjacent the discharge ends of said delivery conveyors and comprising a series of spaced receptacles which travel past the discharge ends of a plurality of said delivery conveyors to receive eggs therefrom and transport them to another level;

a plurality of transfer mechanisms, one for each of said delivery conveyors past which said receptacles travel, each said transfer mechanism comprising:

a perforate platform constructed and arranged to be located at the discharge end of one of said delivery conveyors as a continuation thereof in the direction of travel of said delivery conveyor, and at least one rotor at said platform of substantially planar form rotatable about a horizontal axis transverse to the direction of travel of said delivery conveyor and below the surface of said platform, and said rotor having a plurality of angularly spaced, outwardly extending arms which, as said rotor is rotated in use, project in turn through said platform for propelling eggs along said platform at a controlled rate in the direction of travel of said delivery conveyor to said receptacles of said elevator; and driving means coupled to said rotors of said transfer mechanisms and to said elevator to co-ordinate the rotational speeds of said rotors and the speed of travel of said receptacles of said elevator such that, in use, eggs fed by said rotor of one side transfer mechanism to said elevator do not enter into the same receptacles of said elevator as the eggs fed by said rotor of another one of said transfer mechanisms.

2. Egg collecting apparatus according to claim 1 wherein each said transfer mechanism has a plurality of said rotors which are similar to one another, are spaced coaxially apart and connected for simultaneous rotation, and have their arms correspondingly disposed.

3. Egg collecting apparatus according to claim 2 wherein said arms of each said rotor each have a leading edge which extends radially of said rotational axis of said rotor, and a trailing edge which converges towards the extremity of said leading edge.

4. Egg collecting apparatus according to claim 3 wherein said platform of each said transfer mechanism has a downwardly inclined part extending from adjacent said rotational axis of said rotors towards said elevator, and said trailing edge of each said arm of each said rotor has a step in it which, when the apparatus is in use, provides a stop to restrain eggs from falling freely as they descend said downwardly inclined part of said platform towards said elevator.

5. Egg collecting apparatus according to claim 2 wherein each said rotor has a hub of substantially equilateral triangular shape and three integral equi-angularly spaced arms which extend from the three corners of the hub.

6. Egg collecting apparatus according to claim 5 wherein each said arm of each said rotor has a leading edge which is straight and meets an adjacent side edge of said hub at an obtuse angle, and which extend substantially radially of said rotational axis of said rotor.

7. Egg collecting apparatus according to claim 5 wherein each said arm of each said rotor has a trailing edge which is straight and extends substantially parallel to an adjacent side edge of said hub, and between said trailing edge and said adjacent side edge of said hub there is an inclined step down from said trailing edge to said adjacent side edge.

8. Egg collecting apparatus according to claim 1 wherein each said platform of each said transfer mechanism is of wire grid construction comprising parallel wires extending in the direction of travel of said delivery conveyor, and said rotor is disposed between said parallel wires.

9. Egg collecting apparatus according to claim 1 wherein said elevator comprises a plurality of shallow, open wire-work baskets which constitute said receptacles, and endless chains which carry said baskets and to which drive is transmitted by said driving means.

10. Egg collecting apparatus according to claim 9 wherein said endless chains pass around sprockets on a spindle coupled, to be rotated to drive said elevator, through drive transmitting chains to a motor, said drive transmitting chains being drivably connected to said rotors of said transfer mechanisms to rotate said rotors.

11. Egg collecting apparatus according to claim 1 wherein at said level to which said elevator transports eggs a receptacle is provided to receive the eggs from said elevator.

12. Egg collecting apparatus according to claim 1 wherein at said level to which said elevator transports eggs a receiving conveyor is provided to receive the eggs from said elevator.

13. Egg collecting apparatus according to claim 12 wherein said receiving conveyor comprises a fixed bed and spaced flat slats which travel along said bed, said slats being of a thickness which normally enables them to push eggs along said bed but permits said slats to pass underneath the eggs if the travel of the eggs along said bed is impeded.

14. Egg collecting apparatus according to claim 12 wherein said receiving conveyor forms part of a conveyor system which includes an inclined conveyor having transverse rows of spaced wire carrier fingers for supporting eggs, and which said inclined conveyor runs in the course of its travel along a main upwardly inclined stretch and a shallowly downwardly inclined top stretch running on from the top of said main stretch, there being a rack at the bottom of said main stretch which receives eggs delivered to said inclined conveyor and from which said carrier fingers pick up the eggs to take them up said main stretch to said top stretch, and a platform overlying said top stretch with which said carrier fingers co-operate to transfer eggs supported by said carrier fingers to said platform as said fingers pass along said top stretch.

15. Egg collecting apparatus according to claim 14 wherein spaced slats extend lengthwise of, and close to said inclined conveyor at, said main stretch from the bottom of that stretch to the top thereof and also extend substantially horizontally over said top stretch thereby to define said platform overlying said top stretch, said slats being disposed so that said carrier fingers travel along the spaces between said slats, the construction and arrangement being such that eggs picked up by said carrier fingers lie close against said slats as they are carried upwards along said main stretch, and at said top stretch said carrier fingers gradually move out of engagement with the eggs, leaving the eggs supported entirely by said slats.

16. In a battery cage system for hens comprising a row of tiered cages and delivery conveyors extending one below each tier of cages to receive eggs laid by hens in said cages and deliver the eggs to one end of said row, egg collecting apparatus comprising:
an elevator positioned adjacent the discharge ends of said delivery conveyors and comprising a series of spaced receptacles which travel past the discharge ends of a plurality of said delivery conveyors to receive eggs therefrom and transport them to another level;
a plurality of transfer mechanism one for each of said delivery conveyors past which said receptacles travel, each said transfer mechanism comprising:
a perforate platform located at the discharge end of one of said delivery conveyors as a continuation thereof in the direction of travel of said delivery conveyor, and at least one rotor at said platform of substantially planar form rotatable about a horizontal axis transverse to the direction of travel of said delivery conveyor and below the surface of said platform, and said rotor having a plurality of angularly spaced, outwardly extending arms, which, as said rotor is rotated in use, project in turn through said platform forpropelling eggs along said platform at a controlled rate in the direction of travel of said delivery conveyor to said receptacles of said elevator; and
driving means coupled to said rotors of said transfer mechanisms and to said elevator to co-ordinate the rotational speeds of said rotors and the speed of travel of said receptacles of said elevator such that, in use, eggs fed by said rotor of one said transfer mechanism to said elevator do not enter into the same receptacles of said elevator as the eggs fed by said rotor of another one of said transfer mechanisms.

17. In a battery cage system, egg collecting apparatus according to claim 16 wherein said driving means is also coupled to said delivery conveyors to drive said conveyors.

18. In a battery cage system, egg collecting apparatus according to claim 17 wherein at said level to which said elevator transports eggs a receiving conveyor is provided to receive the eggs from said elevator, and wherein control means is provided at said receiving conveyor which is connected to said driving means and is adapted to operate to stop said driving means in the event of eggs becoming jammed on said receiving conveyor or there being an excessive accumulation of eggs on said receiving conveyor.

19. In a battery cage system, egg collecting apparatus according to claim 18 wherein said control means comprises an electrical, pressure-operated, switch positioned at the side of said receiving conveyor to be sensitive to the pressure of any build-up of eggs at the side of said receiving conveyor.

* * * * *